United States Patent Office 3,364,268
Patented Jan. 16, 1968

3,364,268
PREPARATION OF UNSATURATED CHLORINATED ALCOHOLS FROM TETRACHLOROETHYLENE AND ALCOHOLS USING ORGANIC PEROXIDE CATALYSTS
Tatsuo Matsuda, Showa-ku, Nagoya-shi, and Takaari Yumoto, Mizuho-ku, Nagoya-shi, Japan, assignors to Agency of Industrial Science and Technology, Tokyo, Japan, a corporation of Japan
No Drawing. Filed Dec. 17, 1963, Ser. No. 331,119
Claims priority, application Japan, Dec. 17, 1962, 37/55,356
6 Claims. (Cl. 260—633)

The present invention relates to a method for preparing useful chlorine-containing alcohols, and more particularly to a method for preparing two alcohols, (i) a chlorine-containing saturated alcohol being the 1:1 compound of tetrachloroethylene and alcohol and being represented by the chemical formula $CHCl_2CCl_2ROH$ and (ii) a chlorine-containing unsaturated alcohol which is the dehydrochlorinated product of said saturated alcohol.

These two useful alcohols are produced in accordance with the present invention simply and effectively by mixing tetrachloroethylene and an alcohol having the formula ROH, and reacting them in the presence of an organic peroxide catalyst.

The prior art reports the preparation of saturated alcohols by reacting a hydrocarbon olefin with an alcohol in the presence of a free-radical catalyst. The prior art also discloses the preparation of a fluorine-containing alcohol by the reaction of tetrafluoroethylene and alcohol.

The present invention now provides, for the first time, the reaction of tetrachloroethylene and alcohol, to provide said saturated alcohol and also said unsaturated alcohol. These alcohols are characterized respectively by the saturated alcohol being the afore-described 1:1 addition compound, and the unsaturated alcohol being the dehydrochlorinated derivative thereof.

The compounds prepared in accordance with the present invention may be employed as useful herbicides which are not toxic to fish. In addition to its herbicidical usefulness, the chlorine-containing unsaturated alcohol due to the presence of the unsaturated group, is a useful intermediate in the preparation of a wide range of chlorine-containing organic compounds.

Higher yields of the chlorine-containing alcohols are obtained when employing an amount of alcohol to tetrachloroethylene in excess of the stoichiometric 1:1 ratio. It is preferred to employ a mole ratio of between 1:1 and 1:10.

The catalysts useful in the process of the present invention are the organic peroxides which catalyze free-radical reactions, for example, benzoyl peroxide, 2,4-dichlorobenzoyl peroxide, methyl ethyl ketone peroxide, diisopropyl peroxydicarbonate, di-tertbutyl peroxide, etc. The amount of the peroxide catalyst required is between 1 and 10% of the reaction mixture of tetrachloroethylene and alcohol. The proper temperature and the required period of time for the reaction are dependent upon the specific catalyst utilized and the desired product.

The reaction may be effectuated at low temperatures, such as 35° C., using a catalyst having a low disassociation temperature, such as, diisopropyl peroxydicarbonate. When utilizing benzoyl peroxide as the catalyst, the reaction may proceed at temperatures of 80° C. and the reaction time may be considerably reduced by utilizing an autoclave which is continuously heated to 100° C. or more during reaction. As a general rule, when desiring to produce the chlorine-containing saturated alcohol, it is preferable to employ a catalyst having a relatively low critical (disassociation) temperature, such as the aforespecified diisopropyl peroxydicarbonate, which permits use of a low reaction temperature. Where the desired product is the chlorine-containing unsaturated alcohol, higher reaction temperatures produce better results.

To obtain the desired product from the reaction mixture, unreacted material is evaporated off, leaving purified materials which may be distilled into the desired fractions containing the chlorine-containing saturated alcohol, and the chlorine-containing unsaturated alcohol.

Analysis of these alcohols from the reaction mixture may be determined by gas chromatography using filled silicone grease as the filler. Purification may be obtained by fractional crystallization, or other extraction methods which utilize the different characteristics of the material in the composition.

The process of the present invention is further illustrated in the following examples in which illustrative alcohols and catalysts are utilized.

Example 1

One point six (1.6 g.) grams of diisopropyl peroxydicarbonate is added to a liquid mixture containing eighty-two point five (82.5 g.) grams of tetrachloroethylene (0.5 mole) and sixty-four (64.0 g.) grams of methyl alcohol (2.0 mole), and held for 100 hours at 35° C. under vacuum. Unreacted tetrachloroethylene and methyl alcohol have been collected from the reaction mixture by means of an evaporation process, leaving nine point nine (9.9 g.) grams of remaining liquid. And by the fractional distillation, said remaining liquid has been thus fractionated into two fractions to obtain fraction I at 81.5° C./15 mm. Hg (yield: 12.1%) and fraction II at 97–99° C./15 mm. Hg (yield: 32.3%).

Namely, said Fraction I is represented by the chemical formula $C_3H_3OCl_3$, which is the chlorine-containing unsaturated alcohol which contained a carbon-carbon double bond and which displayed an absorption bond at approximately 1600 cm.$^{-1}$ in the infra-red spectrum, and another Fraction II is the chlorine-containing saturated alcohol, being the 1:1 addition compound, and having the chemical formula $C_3H_4OCl_4$ (Found: C, 18.64%; H, 2.077%; Cl, 70.67%. Calculated: C, 18.21%; H, 2.037%; Cl, 71.67%).

Example 2

Two (2.0 g.) grams of benzoyl peroxide is added to a liquid mixture containing eighty-two point five (82.5 g.) grams of tetrachloroethylene (0.5 mole) and sixty-four (64.0 g.) grams of methyl alcohol (2.0 mole), and reacted at 83° C. in the atmosphere of nitrogen for 7 hours. After that, unreacted tetrachloroethylene and methyl alcohol have been respectively collected by the evaporating process.

At this step, eleven (11.0 g.) grams of the remaining liquid were obtained, said liquid was fractionated into four point five (4.5 g.) grams of the chlorine-containing unsaturated alcohol and three point eight (3.8 g.) grams of the chlorine-containing saturated alcohol.

Example 3

Two (2.0 g.) grams of benzoyl peroxide is added to the mixture of eighty-two point five (82.5 g.) grams of tetrachloroethylene (0.5 mole) and ninety-two (92.0 g.) grams of ethyl alcohol (2.0 mole).

Said mixture was reacted at 83° C. in the atmosphere of nitrogen for 7 hours. In finishing said reaction, the unreacted component was collected by evaporation process.

Fractional distillation was applied to the remaining liquid, whereby, twelve point nine (12.9 g.) grams of Fraction I at 86° C./15 mm. Hg (yield: 56.7%) and four point eight (4.8 g.) grams of Fraction II at 106° C./15 mm. Hg (yield: 17.7%) were recovered.

Said Fraction I is the chlorine-containing unsaturated alcohol represented by the chemical formula $C_4H_5OCl_3$ (Found: C, 27.38%; H, 2.87%; Cl, 60.63%. Calculated: C, 27.64%; H, 3.04%; Cl, 60.50%) and said Fraction II is the chlorine-containing saturated alcohol, being the 1:1 addition compound having the chemical formula $C_4H_6OCl_4$ (Found: C, 22.67%; H, 2.85%; Cl, 66.93%. Calculated: C, 22.95%; H, 2.90%; Cl, 66.85%).

Example 4

Two point one (2.1 g.) grams of diisopropyl peroxydicarbonate is added to the mixture of eighty-two point five (82.5 g.) grams of tetrachloroethylene and ninety-two (92.0 g.) grams of ethyl alcohol, and held for 100 hours at 35° C. under vacuum.

Unreacted tetrachloroethylene and ethyl alcohol have been respectively collected by means of an evaporating process, leaving forty-four (44.0 g.) grams of remaining liquid.

Fractional distillation was applied to said remaining liquid to obtain eleven (11.0 g.) grams of chlorine-containing unsaturated alcohol (yield: 28.9%) and twenty-three point five (23.5 g.) grams of chlorine-containing saturated alcohol (yield: 51.3%).

Example 5

Table No. 1 shows the amount and yield of both chlorine-containing saturated alcohol and chlorine-containing unsaturated alcohol obtained in accordance with an experiment in which eighty-two point five (82.5 g.) grams of tetrachloroethylene and ninety-two (92.0 g.) grams of ethyl alcohol is reacted using the various organic peroxides specified, using the procedure of Example 4.

C./15 mm. Hg (yield: 38.9%) and five point two (5.2 g.) grams of Fraction II at 113° C./15 mm. Hg (yield saturated alcohol represented by the chemical formula $C_5H_7OCl_3$ which contained fifty-five point sixty-five (55.65%) percent of Cl.

24.5%). Said Fraction I is the chlorine-containing unsaturated alcohol, being the 1:1 addition compound which has the chemical formula $C_5H_8OCl_4$ (Found: C, 27.17%; H, 3.615%; Cl, 62.99%. Calculated: C, 26.58%; H, 3.565%; Cl, 62.77%).

Example 7

Following the procedure of Example 6, and using isopropyl alcohol instead of the n-propyl alcohol, the unreacted components were removed therefrom to obtain twenty-five (25.0 g.) grams of remaining liquid. Fractional distillation was applied to the remaining liquid to obtain six point five (6.5 g.) grams of Fraction I at 81–83° C./15 mm. Hg (yield: 23.0%) and eight point five (8.5 g.) grams of Fraction II at 108–109° C./15 mm. Hg (yield: 25.1%). Fraction I is the chlorine-containing unsaturated alcohol represented by the chemical formula $C_5H_7OCl_3$, and Fraction II is the chlorine-containing saturated alcohol represented by the chemical formula $C_5H_8OCl_4$.

Example 8

Two (2.0 g.) grams of benzoyl peroxide is added to the mixture of eighty-two point five (82.5 g.) grams of tetrachloroethylene (0.5 mole) and seventy-four (74.0 g.) grams of n-butyl alcohol (1.0 mole) and reacted in the atmosphere of nitrogen at 105° C. for 7 hours.

The unreacted component was removed therefrom to obtain fifteen (15.0 g.) grams of remaining liquid. Fractional distillation was applied to the remaining liquid, to obtain six point eight (6.8 g.) grams of a fraction (yield: 34.7%) at 93° C./15 mm. Hg.

This fraction is the chlorine-containing unsaturated alcohol represented by the chemical formula $C_6H_9OCl_3$ which contained fifty-two point twenty-four (52.24%) percent of Cl.

What we claim is:

1. A process for producing chlorine-containing alcohols comprising
   reacting tetrachloroethylene with a lower alkanol in the presence of an organic peroxide catalyst at a temperature sufficiently high to decompose said peroxide catalyst, to produce a reaction mixture containing
   (i) the dehydrochlorinated 1:1 addition product of tetrachloroethylene and said lower alkanol.

2. The process, as set forth in claim 1, wherein said reaction is carried out in an inert atmosphere or under vacuum.

3. The process, as set forth in claim 2, wherein said dehydrochlorinated chlorine-containing alkanol is recovered from said reaction mixture.

4. The process, as set forth in claim 3, wherein said lower alkanol is selected from the group consisting of methyl alcohol, ethyl alcohol and butyl alcohol.

TABLE NO. 1

| Peroxide | Grams | Condition | | Product | | | | |
|---|---|---|---|---|---|---|---|---|
| | | Temp. (° C.) | Time (hr.) | Remaining liquid (g.) | Unsat. alcohol | | Sat. alcohol | |
| | | | | | Amount (g.) | Yield (percent) | Amount (g.) | Yield (percent) |
| Lauroyl peroxide | 2.0 | 70 | 3 | 12.7 | 5.4 | 29.1 | 3.3 | 14.9 |
| 2,4-dichloro benzoyl peroxide | 2.0 | 70 | 3 | 9.5 | 3.4 | 25.1 | 2.2 | 13.3 |
| Methyl ethyl ketone peroxide | 2.0 | 70 | 3 | 10.7 | 4.7 | 24.9 | 2.9 | 12.9 |
| Lauroyl peroxide | 7.2 | 70 | 3 | 25.0 | 7.4 | 30.9 | 2.7 | 9.2 |
| Di-tert-butyl peroxide | 2.0 | 83 | 5.5 | 4.0 | 1.5 | 24.7 | 0.9 | 11.7 |

Example 6

Two point one (2.1 g.) grams of diisopropyl peroxydicarbonate is added to the mixture of eighty-two point five (82.5 g.) grams of tetrachloroethylene (0.5 mole) and one hundred and twenty (120.0 g.) grams of n-propyl alcohol (2.0 mole) and held for 100 hours at 35° C. under vacuum. And then unreacted tetrachloroethylene and n-propyl alcohol have been respectively collected by means of an evaporating process, leaving twenty-one (21.0 g.) grams of remaining liquid. Fractional distillation has been applied to the remaining liquid, to obtain seven point four (7.4 g.) grams of Fraction I at 90–91.5°

5. The process, as set forth in claim 4, wherein said reaction is carried out at a temperature between 35° C. and 100° C.

6. The process, as set forth in claim 3, wherein said reaction is carried out at a temperature between 35° C. and 100° C.

References Cited

UNITED STATES PATENTS

| | | | |
|---|---|---|---|
| 2,559,628 | 7/1951 | Joyce | 260—633 |
| 2,568,859 | 9/1951 | Ladd et al. | 260—633 |
| 3,213,149 | 10/1965 | Takahashi et al. | 260—642 |

OTHER REFERENCES

Hiroshige, J.: Org. Chem., vol. 27 (1962), pp. 2325 to 2328.

Park et al.: J. Org. Chem., vol. 26 (1961), pp. 2089 etc.

Nikishin: Isz. Akad. Nauk., No. 6 (1959), pp. 1134 to 1137.

LEON ZITVER, *Primary Examiner.*

J. E. EVANS, *Assistant Examiner.*